US009388058B2

(12) United States Patent
Koch

(10) Patent No.: US 9,388,058 B2
(45) Date of Patent: Jul. 12, 2016

(54) WATER SOFTENING DEVICE

(71) Applicant: Kenneth A. Koch, Cincinnati, OH (US)

(72) Inventor: Kenneth A. Koch, Cincinnati, OH (US)

( * ) Notice: Subject to any disclaimer, the term of this patent is extended or adjusted under 35 U.S.C. 154(b) by 255 days.

(21) Appl. No.: 14/083,611

(22) Filed: Nov. 19, 2013

(65) Prior Publication Data
US 2014/0138321 A1 May 22, 2014

Related U.S. Application Data

(60) Provisional application No. 61/727,926, filed on Nov. 19, 2012.

(51) Int. Cl.
| | |
|---|---|
| C02F 1/42 | (2006.01) |
| B01J 39/02 | (2006.01) |
| B01J 39/08 | (2006.01) |
| B01J 49/00 | (2006.01) |
| C02F 1/00 | (2006.01) |
| C02F 1/28 | (2006.01) |

(52) U.S. Cl.
CPC . *C02F 1/42* (2013.01); *B01J 39/02* (2013.01); *B01J 39/08* (2013.01); *B01J 49/0069* (2013.01); *B01J 49/0008* (2013.01); *C02F 1/001* (2013.01); *C02F 1/281* (2013.01); *C02F 2001/425* (2013.01); *C02F 2201/005* (2013.01); *C02F 2201/006* (2013.01); *C02F 2201/009* (2013.01); *C02F 2301/043* (2013.01); *C02F 2303/16* (2013.01); *C02F 2305/14* (2013.01); *C02F 2307/06* (2013.01)

(58) Field of Classification Search
CPC .... B01J 49/0008; B01J 49/0069; B01J 39/02; B01J 39/08; C02F 2001/425; C02F 2303/16; C02F 1/42; C02F 1/001; C02F 1/281; C02F 2201/005; C02F 2201/006; C02F 2301/043; C02F 2305/14; C02F 2307/06; C02F 2201/009
USPC .......................................................... 210/190
See application file for complete search history.

(56) References Cited

U.S. PATENT DOCUMENTS

| | | | |
|---|---|---|---|
| 1,233,016 A | 7/1917 | Bartlett | |
| 1,423,132 A | 7/1922 | Magrath | |
| 1,611,422 A | 12/1926 | Duden | |
| 1,703,451 A | 2/1929 | McGill | |
| 1,873,305 A | 8/1932 | DeVille | |
| 1,940,965 A * | 12/1933 | Nash | C02F 1/42 210/190 |

(Continued)

OTHER PUBLICATIONS

U.S. Appl. No. 60/939,886, filed May 24, 2007.

*Primary Examiner* — Matthew O Savage
(74) *Attorney, Agent, or Firm* — Frost Brown Todd LLC

(57) ABSTRACT

A system comprises an input, a brine chamber, a water softening chamber, and an output. One or more valves are configured to selectively prevent fluid communication of water from the input into the brine chamber; and to selectively permit communication of brine from the brine chamber to the water softening chamber when water is not being communicated through the input. The output is configured to output water softened in the water softening chamber. The one or more valves may include a first valve and a second valve. The first valve may be responsive to water being communicated through the input. The second valve may be responsive to either manual actuation or a fluid level in the brine chamber. The system may further include a cartridge that is removably coupled with the water softening chamber. The cartridge may contain salt and may further define the brine chamber.

14 Claims, 13 Drawing Sheets

(56) References Cited

U.S. PATENT DOCUMENTS

| | | |
|---|---|---|
| 2,006,287 A | 6/1935 | Wilbanks |
| 2,347,201 A | 4/1944 | Lindsay |
| 2,627,503 A | 2/1953 | Andersen |
| 2,832,373 A | 4/1958 | Scholer |
| 3,342,336 A | 9/1967 | Rose |
| 3,627,133 A * | 12/1971 | Rak ................. B01J 49/0086 210/140 |
| 4,698,272 A | 10/1987 | Inokuti et al. |
| 6,379,630 B1 | 4/2002 | Wilfong et al. |
| 6,521,132 B2 | 2/2003 | Hughes |
| 6,666,971 B2 | 12/2003 | Chen |
| 6,790,362 B2 | 9/2004 | FitzGerald et al. |
| 6,863,808 B2 | 3/2005 | Fullmer et al. |
| 2004/0144702 A1 | 7/2004 | Zimmerman et al. |
| 2004/0188330 A1 | 9/2004 | Slawson et al. |
| 2004/0251187 A1 | 12/2004 | Chernoff |
| 2008/0290009 A1 | 11/2008 | Koch |

* cited by examiner

WATER SOFTENING DEVICE

PRIORITY

This application claims priority to U.S. Provisional Patent App. No. 61/727,926, entitled "Water Softening Device," filed Nov. 19, 2012, the disclosure of which is incorporated by reference herein.

BACKGROUND

Some embodiments of the present invention relate to a device that may be used to soften water. In some instances, the device may be coupled with a shower head to soften water before it exits the shower head. One exemplary device for softening water is disclosed in U.S. Pat. No. 6,521,132, entitled "Ion Exchange Water Softener and Method," the disclosure of which is incorporated by reference herein. Another exemplary device for softening water is disclosed in U.S. Pat. No. 1,611,422, entitled "Process of Regenerating Zeolites," the disclosure of which is incorporated by reference herein. Yet another exemplary device for softening water is disclosed in U.S. Pub. No. 2008/0290009, entitled "Water Softening Device," the disclosure of which is incorporated by reference herein. While a variety of systems and methods have been made and used to soften water, it is believed that no one prior to the inventors has made or used a system as described herein.

BRIEF DESCRIPTION OF THE DRAWINGS

It is believed the present invention will be better understood from the following description of certain examples taken in conjunction with the accompanying drawings, in which like reference numerals identify the same elements and in which.

Figure 1:
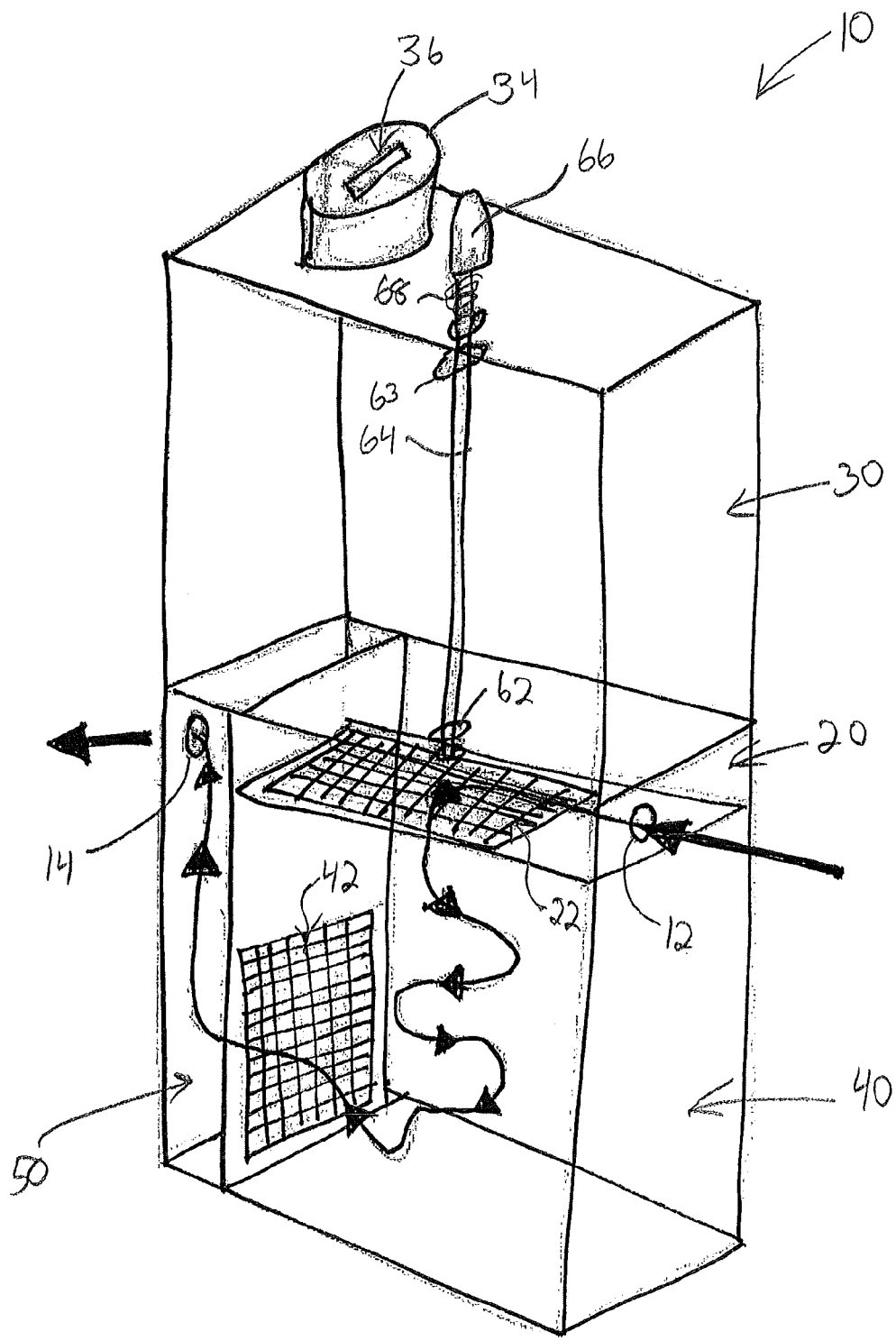
FIG. 1 depicts a schematic perspective view of an exemplary water softening system.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

I. Exemplary Water Softening System Using Salt Slabs

FIGS. 1-4 illustrate an exemplary water softening device (10) that comprises an input chamber (20), a salt chamber (30), an ion exchange chamber (40), and an output chamber (50), each of which will be described in greater detail below. Water softening device (10) further comprises an input port (12) and an output port (14). Input port (12) is in fluid communication with input chamber (20) and is configured to couple with any suitable source of water (e.g., residential water piping, etc.) in any suitable fashion (e.g., with a threaded fitting, with a compression fitting, via soldering, etc.). Output port (14) is in fluid communication with output chamber (50) and is configured to couple with any suitable plumbing feature (e.g., a pipe, a hose, etc.) in any suitable fashion (e.g., with a threaded fitting, with a compression fitting, via soldering, etc.) to communicate softened water. Each port (12, 14) may include any suitable gaskets, o-rings, or other structures to prevent undesired leakage at such interfaces. Chambers (20, 40, 50) provide a fluid path from input port (12) to output port (14), while some fluid is communicated to and from salt chamber (30) as well. While chambers (20, 30, 40, 50) are shown as being generally rectangular in cross-section, it should be understood that chambers (20, 30, 40, 50) may alternatively have any other suitable shapes or cross-sections (e.g., tubular, round, etc.). Furthermore, suitable internal volumes or capacities for chambers (20, 30, 40, 50), and suitable relationships between such volumes, will be apparent to those of ordinary skill in the art in view of the teachings herein.

In the present example, a filter (22) is positioned between input chamber (20) and ion exchange chamber (40). Similarly, a filter (42) is positioned between ion exchange chamber (40) and output chamber (50). By way of example only, filters (22, 42) may be configured to filter particulate from water that is communicated from input port (12) to output port (14). In addition or in the alternative, filters (22, 42) may be configured to substantially remove a variety of other substances from such water. Filters (22, 42) may be configured in accordance with any suitable conventional water filter. In some versions, filters (22, 42) are replaceable. Water softening device (10) may provide ready access to enable replacement of filters (22, 42). In some other versions, one or both of filters (22, 42) are simply omitted.

Ion exchange chamber (40) of the present example comprises a plurality of zeolite beads (not shown), which are configured to strip dissolved calcium and magnesium ions, among other things, from water that is communicated into ion exchange chamber (40) from input chamber (20). Water that passes through ion exchange chamber (40) and into output chamber (50) is thus softened by the zeolite beads. Of course, any suitable alternative to zeolite beads may be used, including but not limited to any suitable ion exchange resin or other material(s). Filters (22, 42) are configured to prevent passage of the zeolite beads from ion exchange chamber (40) to either input chamber (20) or output chamber (50).

In some versions, ion exchange chamber (40) is configured to receive a replaceable cartridge containing zeolite beads. Such a cartridge may be replaced when zeolite beads are spent and can no longer be effectively recharged by brine from salt chamber (30). Such a cartridge may also be configured such that zeolite beads contained therein cannot be replaced without destroying the cartridge, such that replacing the zeolite beads of water softening device (10) will require a new cartridge. Still other ways in which ion exchange chamber (40) may be varied to provide replacement of zeolite beads will be apparent to those of ordinary skill in the art in view of the teachings herein.

Salt chamber (30) is configured to hold salt (not shown) to generate brine in order to recharge the zeolite beads in ion exchange chamber (40). In the present example, a pair of valves (32, 62) are positioned between input chamber (20) and salt chamber (30). It should be noted that valve (32) is omitted from FIG. 1 but is shown in FIG. 2. Valve (32) is configured to prevent the flow of water from input chamber (20) into salt chamber (30) while water softening device (10) is in use (e.g., when water is being communicated through input port (12)). However, when water softening device (10) is not in use (e.g., when water is no longer being communicated through input port (12)), valve (32) opens to allow brine to flow from salt chamber (30) into ion exchange chamber (40), under the influence of gravity due to the brine having a density that is greater than the density of water, via input chamber (20). The lighter water in chambers (20, 40) may flow up through valve (32) into salt chamber (30). Valve (32) thus provides selective communication of fluid from salt chamber (30) to input chamber (20) and ion exchange chamber (40); and only opens when water is not flowing from input port (12) to output port (14). By contrast, and as will be described in greater detail below, valve (62) provides one-way flow of fluid from input chamber (20) to salt chamber (30); and is only opened when water is flowing into input port (12).

Valve (32) of the present example comprises an arm (34) and a pivot (36). In some versions, valve (32) is urged closed by hydrostatic pressure of water within a substantially full input chamber (20). In some other versions, valve (32) is urged closed by hydrodynamic pressure induced by the flow of water through input chamber (20). By way of example only, input chamber (20) and/or other components may be configured such that the hydrodynamic pressure induced by the flow of water through input chamber (20) (i.e., from input port (12) to ion exchange chamber (40)) is greater than the hydrostatic pressure of brine within salt chamber (30). Operation of valve (32) may also be varied based on the length of arm (34) and/or the location of pivot (36). It will be appreciated that valve (32) as described herein is merely exemplary, and that valve (32) may be substituted, supplemented, or varied in any suitable way. By way of example only, valve (32) may alternatively lack arm (34) and/or pivot (36), may have any other suitable structures and features, and/or may operate under any other suitable principles or conditions. It should be understood that valve (32) is closed when water is flowing into input port (12); and that valve (32) is opened with water stops flowing into input port (12). Valve (32) may be biased to an open position by gravity, by a resilient member (e.g., torsion spring, compression spring, leaf spring, etc.), and/or by something else.

Valve (62) of the present example is positioned on the lower end of a rod (64), which extends upwardly through salt chamber (30) to a plunger (66) that is located above salt chamber (30). A coil spring (68) is positioned coaxially about rod (64) and exterior to salt chamber (30). Spring (68) resiliently biases rod (64) and valve (62) to an upper position. When valve (62) is in the upper position, valve (62) is closed, thereby preventing fluid communication between chambers (20, 30) at valve (62). When valve (62) is in the lower position, valve (62) opens up a fluid path between chambers (20, 30), allowing water to be communicated from input chamber (20) to salt chamber (30). When water is communicated from input chamber (20) to salt chamber (30), the water dissolves salt in salt chamber (30) to form brine. In the present example, another valve (63) is positioned about rod (64) at the top of salt chamber (30) and is operable to open a vent opening at the top of salt chamber (30) when rod (64) is in a downward position. Such venting may enable salt chamber (30) to fill with water more freely, without creating excessive pressure within water softening device (10). Valve (63) may close the vent opening when rod (64) returns to the upper position.

Figure 2:
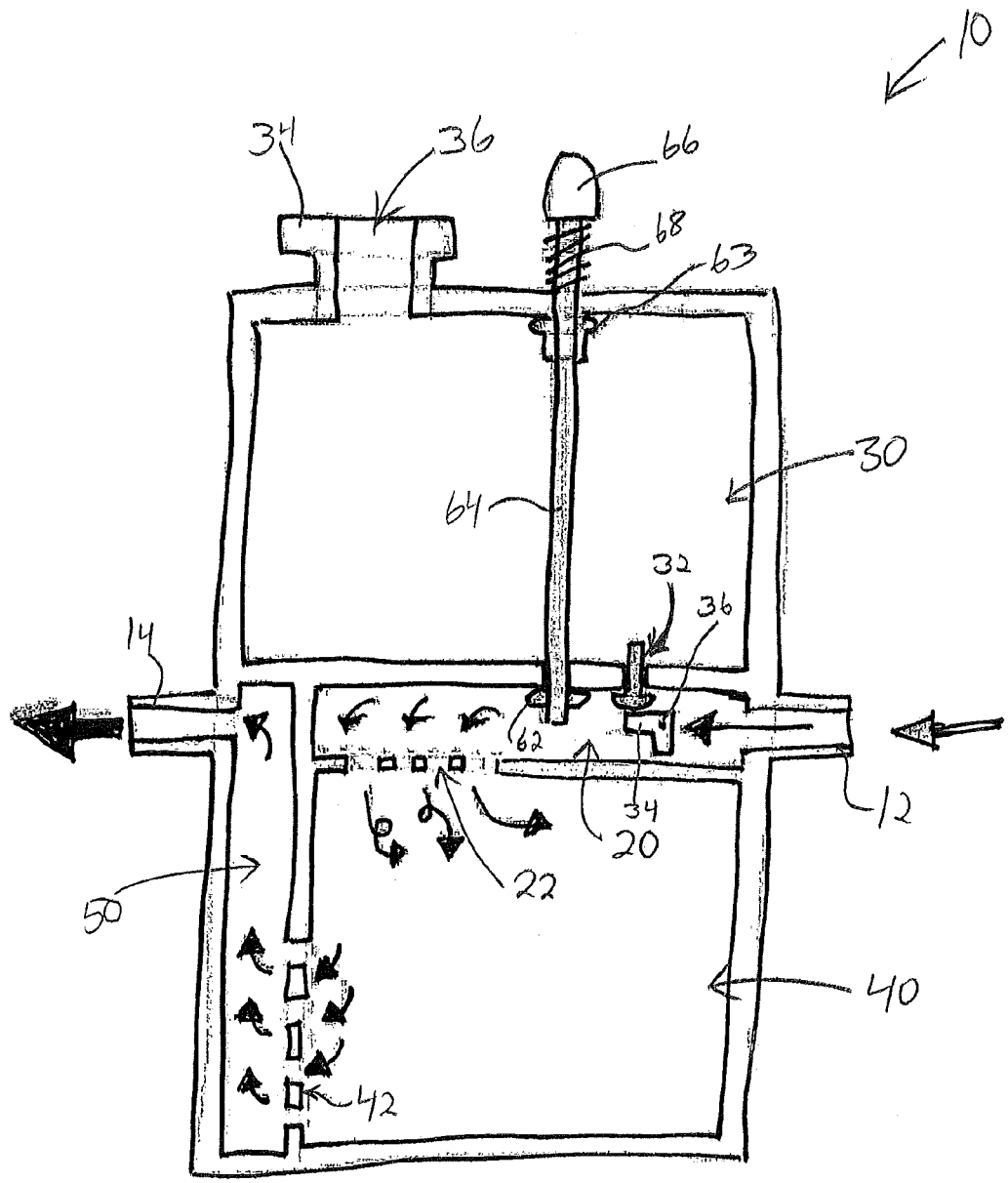
FIG. 2 depicts a front cross-sectional view of the water softening system of FIG. 1.
Figure 3:
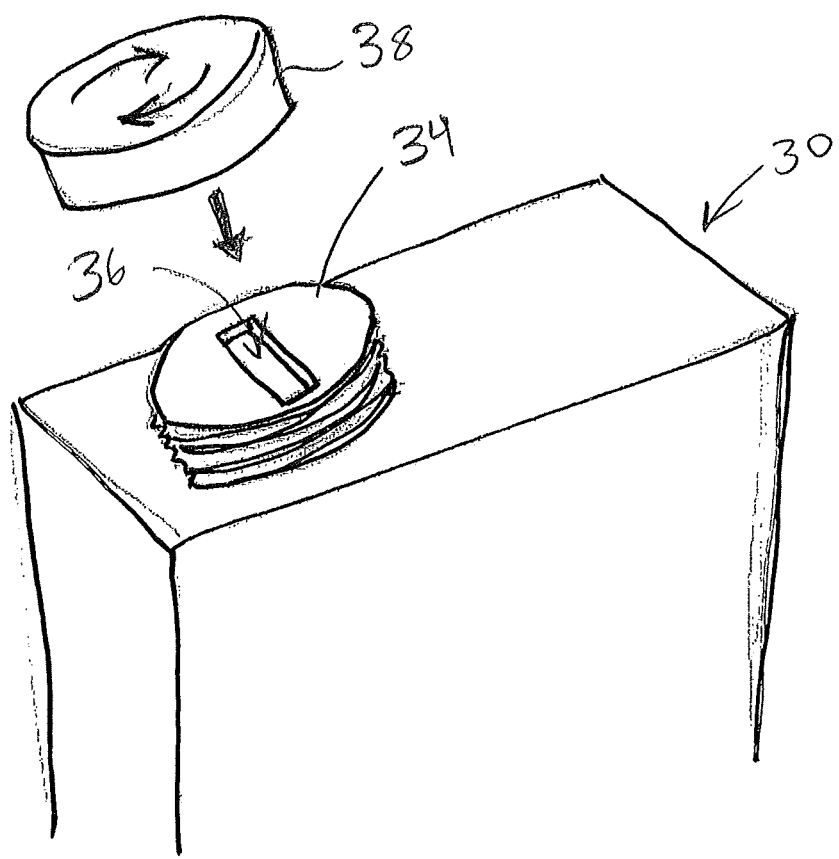
FIG. 3 depicts a perspective view of the salt slab port of the water softening system of FIG. 1.
Figure 4:
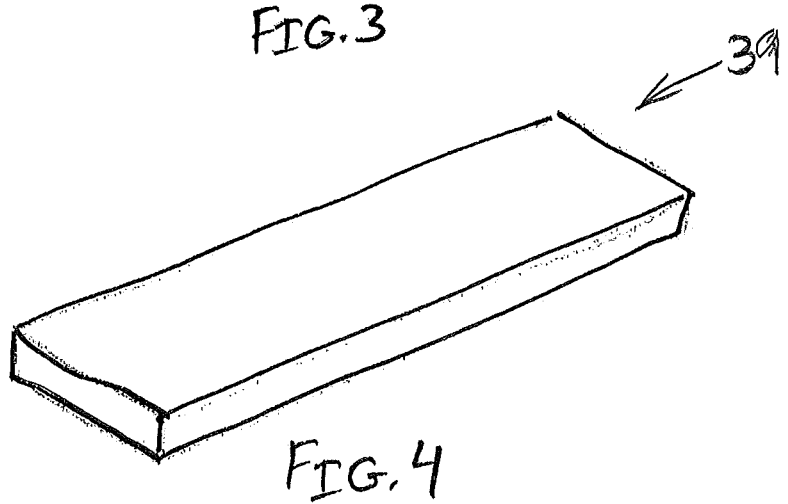
FIG. 4 depicts a perspective view of an exemplary salt slab.

As shown in FIGS. 1-3, salt chamber (30) of the present example includes a salt port (34) for receiving salt. Salt port (34) defines a rectangular slot (36) that is in communication with the interior of salt chamber (30). Salt port (34) is configured to removably receive a cap (38) through a threaded coupling, though it should be understood that slot (36) may alternatively be selectively covered in any other suitable fashion using any other suitable types of features. Slot (36) is configured to receive a salt slab (39), which is formed of compressed salt and has a solid rectangular form as shown in FIG. 4. In the present example, slot (36) is dimensioned such that slot (36) is too small to permit conventional water softener salt pellets to pass through slot (36), such that salt slabs (39) are the only appropriate forms of salt to insert into salt chamber (30). It should also be understood that salt chamber (30) may include an internal basket, tray, or other structure that receives salt slab (39), such that salt slab (39) does not simply drop to the bottom of salt chamber (30) when salt slab (39) is inserted through slot (36). Alternatively, salt slab (39) may simply drop to the bottom of salt chamber (30) when salt slab (39) is inserted through slot (36).

In some versions, a single salt slab (39) is inserted into salt chamber (30) to recharge salt chamber (30). In some other versions, a predetermined number of salt slabs (39) greater than one is inserted into salt chamber (30) to recharge salt chamber (30). For instance, in some versions a user may insert three salt slabs (39), one right after the other in a series, in order to recharge salt chamber (30). Salt slab (39) may comprise a specially formed regenerative salt. Alternatively, salt slab (39) may comprise sodium chloride (e.g., table salt, etc.), potassium chloride, or any other suitable substance(s), material(s), fluid(s), etc. Other variations of salt slab (39), including but not limited to substitutes and/or supplements for salt slab (39), will be apparent to those of ordinary skill in the art in view of the teachings herein.

Figure 5:
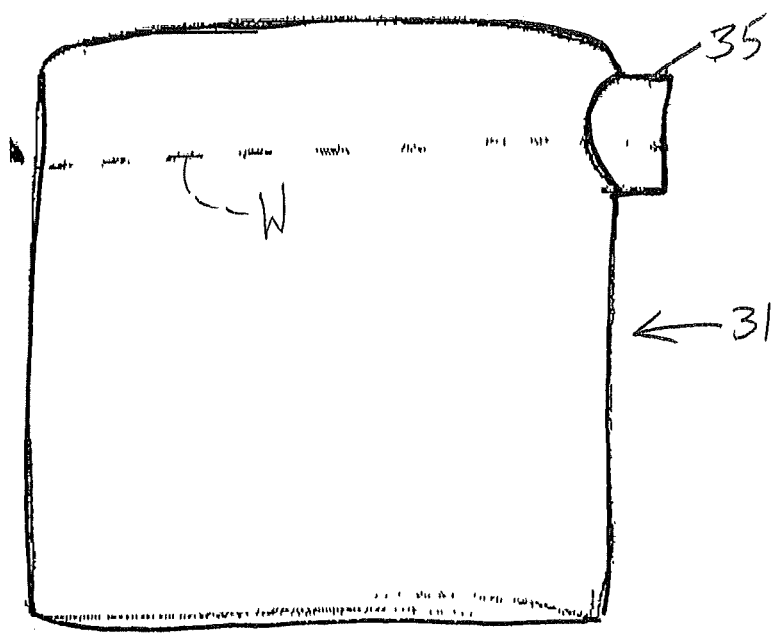
FIG. 5 depicts a front elevational view of an exemplary alternative housing for the water softening system of FIG.1.
Figure 6:
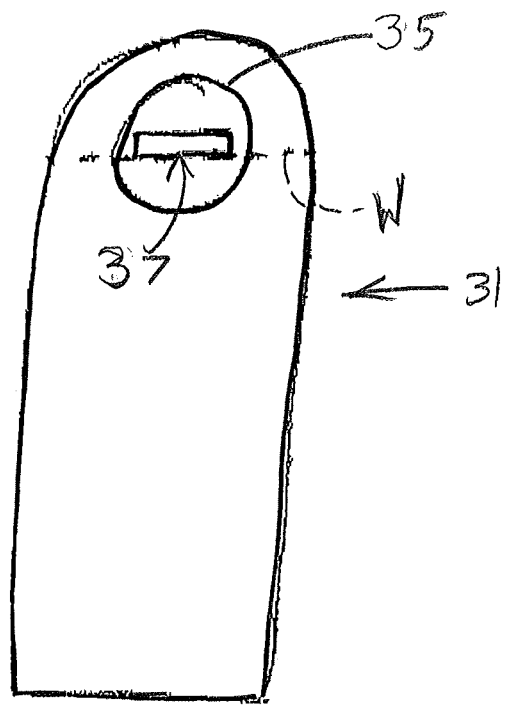
FIG. 6 depicts a side elevational view of the housing of FIG. 5.

Salt port (34) is positioned at the top of salt chamber (30) in the example shown in FIGS. 1-3, such that salt slabs (39) travel along a vertical, downward path during insertion through slot (36) into salt chamber (30). In some other versions, salt port (34) has a different orientation. One merely illustrative alternative is shown in FIGS. 5-6. In this version, an alternative salt chamber (31) includes a salt port (35) on the side of salt chamber (31). When a user inserts a salt slab (39) into the slot (37) of this port (35), the salt slab travels along a generally horizontal path. As can also be seen in FIG. 5-6, salt chamber (31) is configured such that the water level (W) will not go above the bottom of slot (37). This may be accomplished using an overflow tube and/or any other suitable type of feature as will be apparent to those of ordinary skill in the art in view of the teachings herein.

In some other versions, salt chamber (30) receives a replaceable cartridge that houses salt for the generation of brine. An example of such a configuration will be described in greater detail below, while other examples will be apparent to those of ordinary skill in the art in view of the teachings herein. As another merely illustrative variation, some versions of water softening device (10) may permit conventional salt pellets to be used in salt chamber (30). As yet another merely illustrative variation, salt chamber (30) may receive salt packets, slabs, pellets, etc. that are encased in a water soluble film or skin. For instance, such a film or skin may dissolve after soaking in water in salt chamber (30) for a certain period of time. Other suitable ways in which salt chamber (30) may be varied to provide replacement of salt, to the extent that it is desired to provide replaceability of salt, will be apparent to those of ordinary skill in the art in view of the teachings herein.

In some versions, water softening device (10) comprises a selective bypass (not shown) that a user may operate to bypass at least ion exchange chamber (40). For instance, such a bypass may comprise a selectively activated fluid connection between input port (12) and output port (14), with whatever appropriate valve(s) and/or other structure(s) that may be desired to selectively prevent the flow of water through at least part of water softening device (10). Such a bypass may be activated by a mechanical feature (e.g., knob, handle, etc.), an electromechanical feature (e.g., thin film switch, button, etc.), or any other suitable type of feature. Other suitable variations of water softening device (10) will be apparent to those of ordinary skill in the art in view of the teachings herein.

In an exemplary use of water softening device (10), a user opens a valve to start communicating water (e.g., hard water) from input port (12) toward output port (14). The water travels through input chamber (20), then through filter (22), to reach ion exchange chamber (40). The flow of water and/or associated pressures close valve (32). While the water passes through ion exchange chamber (40), the charged zeolite beads in ion exchange chamber (40) soften the water. The softened water continues through filter (42), then through output chamber (50), and then ultimately through output port (14). At some point during the flow of water into input port (12), the user pushes plunger (66) downwardly to open up a fluid path between input chamber (20) and salt chamber (30) at valve (62). This enables water to flow into salt chamber (30) to form brine. The user may continue to hold plunger (66) down for a predetermined time, then release plunger (66) to enable spring (68) to drive rod (64) upwardly to close valve (62). The user eventually closes a valve to cut off the supply of water to input port (12). The resulting stoppage of water and/or reduction in pressure causes valve (32) to open, thereby allowing brine to flow down from salt chamber (30) into ion exchange chamber (40) under the influence of gravity since brine is heavier than fresh water. The brine recharges the zeolite beads in ion exchange chamber (40), such that the zeolite beads are ready to soften water again during the next use.

There are numerous ways to alert the user when plunger (66) has been depressed long enough to sufficiently fill salt chamber (30) with water. By way of example only, salt chamber (30) may include a window enabling the user to see how much water is in salt chamber (30). As another merely illustrative example, a reciprocating indicator with a lower float may protrude upwardly from salt chamber (30), such that the indicator moves upwardly when the water level reaches the float, providing visual feedback to the user. As still another merely illustrative example, one or more sensors may trigger an audible and/or visual alert such as an audible tone and/or light to inform the user that the water has reached an appropriate level in salt chamber (30). Other suitable ways in which the user may be informed that an appropriate level of water has been reached in salt chamber (30) will be apparent to those of ordinary skill in the art in view of the teachings herein.

Figure 7:
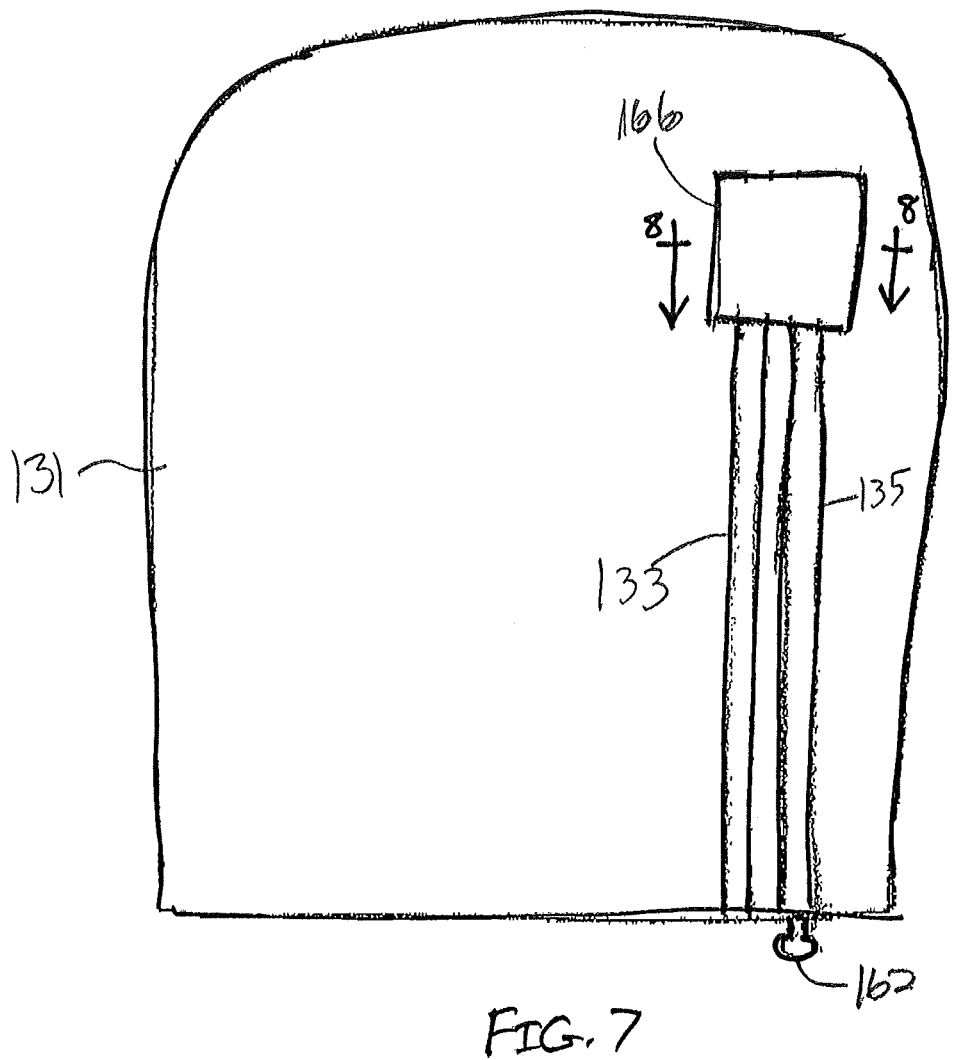
FIG. 7 depicts an exemplary alternative float valve for the water softening system of FIG. 1.
Figure 8:
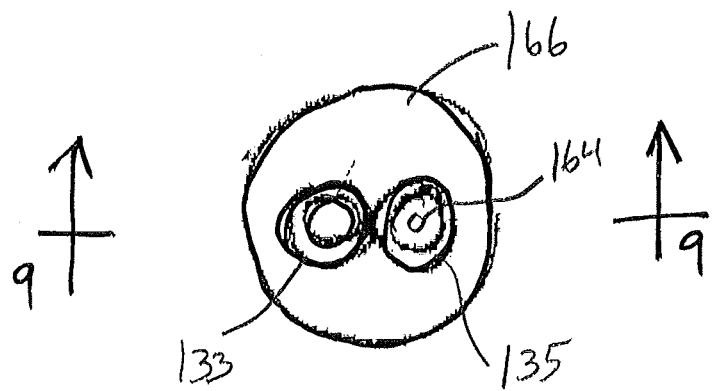
FIG. 8 depicts a top cross-sectional view of the float valve of FIG. 7, taken along line 8-8 of FIG. 7.
Figure 9:
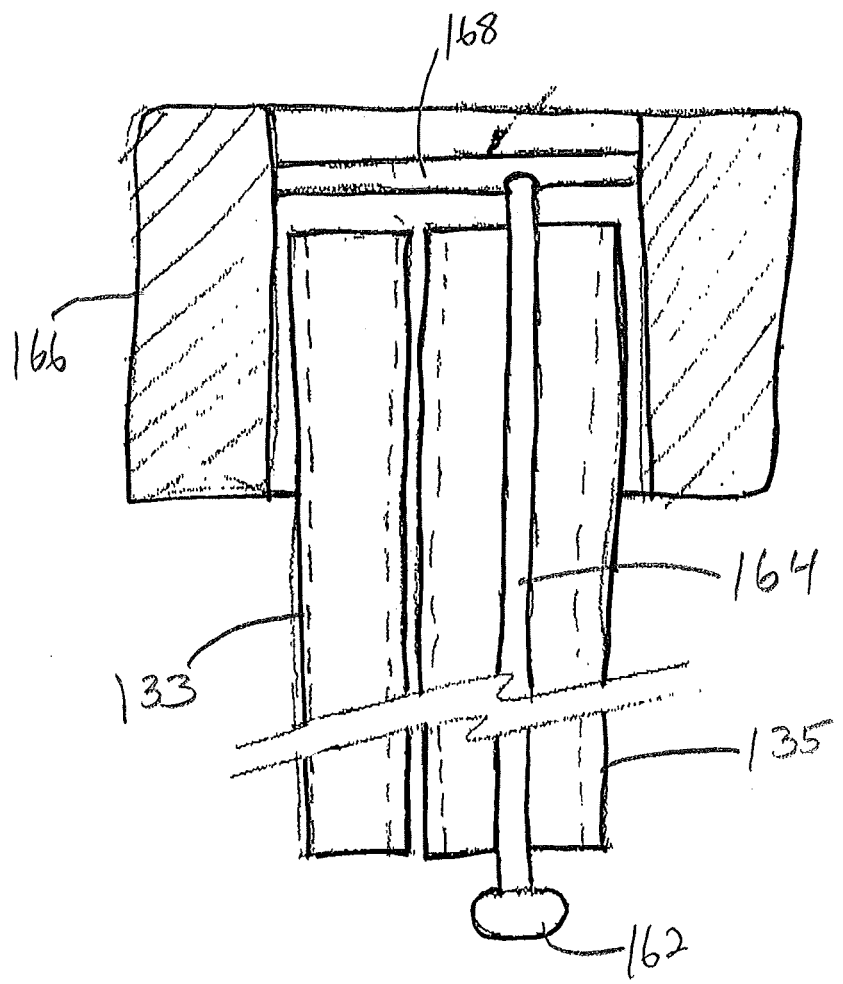
FIG. 9 depicts a cross-sectional view of the float valve of FIG. 7, taken along line 9-9 of FIG. 8.
Figure 10:
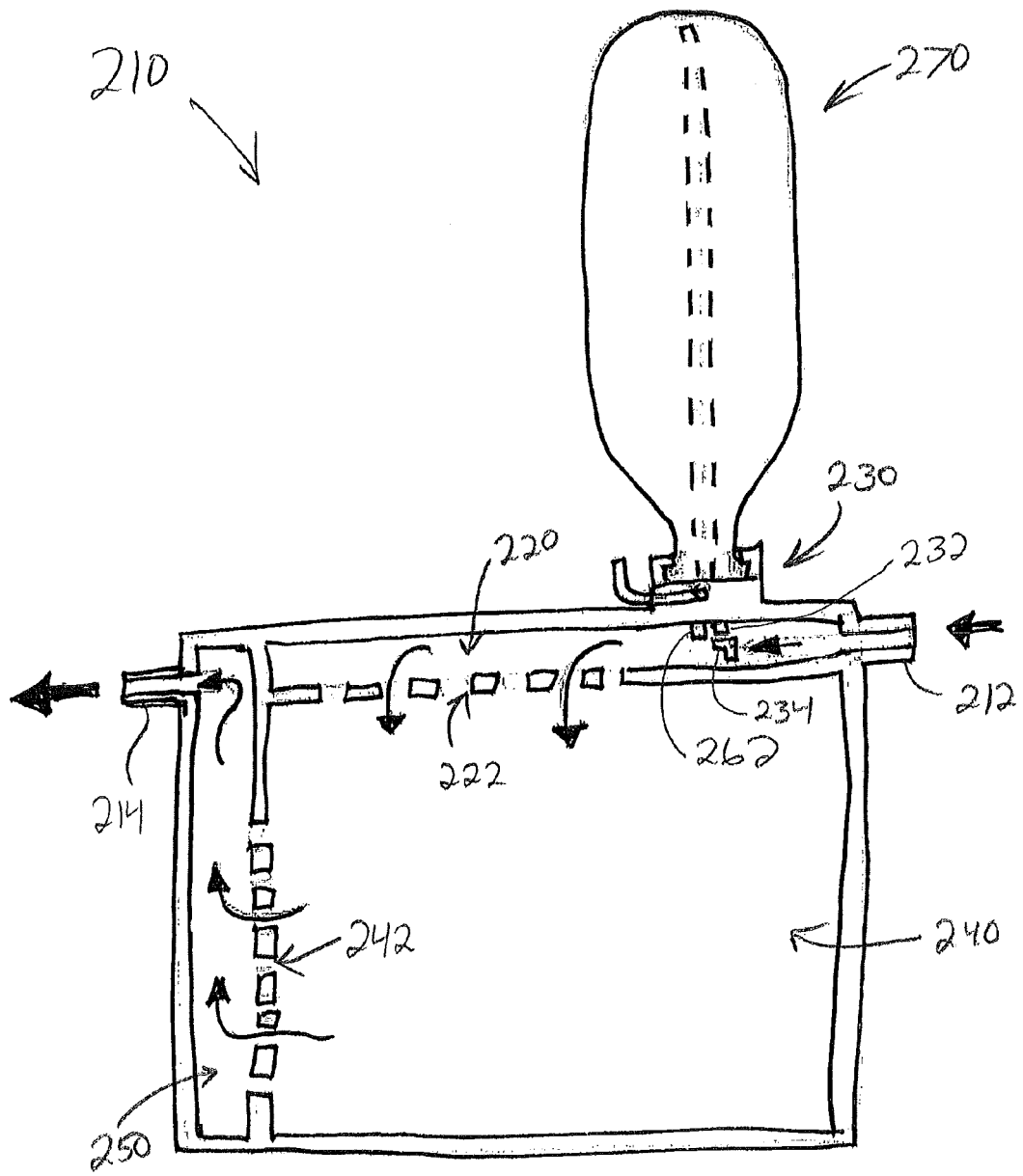
FIG. 10 depicts a front cross-sectional view of an exemplary alternative water softening system.

As another merely illustrative example, operation of valve (62) may be automated. For instance, FIGS. 7-9 show a variation where a mechanical sensor is used to drive a mechanical valve to automatically regulate the water level in salt chamber (131). In particular, salt chamber (131) of this example includes a mechanical sensor in the form of a float (166) positioned atop a vent tube (133). Float (166) is configured to translate linearly relative to vent tube (133), which is fixedly secured to the floor of salt chamber (131). As best seen in FIG. 9, a cross-beam (168) is secured to float (166). A rod (164) extends downwardly from cross-beam (168). Rod (164) is disposed within a fill tube (135), and is operable to reciprocate within fill tube (135). Valve (162) is located at the bottom of rod (164) and is configured to selectively open/close fluid communication between salt chamber (131) and input chamber (20) via fill tube (135). In particular, valve (162) opens fluid communication through fill tube (135), thereby opening fluid communication between salt chamber (131) and input chamber (20), when valve (162), rod (164), cross-beam (168), and float (166) are in a lower position. When valve (162) is opened, fill tube (135) enables water to flow from input chamber (20) into salt chamber (30) in a manner similar to that described above.

Valve (162) closes fluid communication through fill tube (135), thereby closing fluid communication between salt chamber (131) and input chamber (20), when valve (162), rod (164), cross-beam (168), and float (166) are in an upper position. Float (166) is positioned to carry valve (162), rod (164), and cross-beam (168) to the upper position when an appropriate level of water has been reached in salt chamber (131). When the water level drops in salt chamber (131), gravity pulls valve (162), rod (164), cross-beam (168), and float (166) to the lower position. This drop in water level may occur when valve (32) opens as described above. Valve (162) thus remains open until salt chamber (131) again fills with an appropriate level of water.

Other suitable forms of mechanical sensors for regulating the water level in salt chamber (30, 131) will be apparent to those of ordinary skill in the art in view of the teachings herein. It should also be understood that an electrical and/or electromechanical sensor may be used to activate an electromechanical valve when the water reaches an appropriate level in salt chamber (30, 131). As yet another example, a mechanical and/or electrical timer may be used to activate a mechanical and/or electromechanical valve when the water reaches an appropriate level in salt chamber (30, 131). Numerous suitable ways in which such variations may be carried out will be apparent to those of ordinary skill in the art in view of the teachings herein.

II. Exemplary Water Softening System Using Salt Cartridges

Figure 11:
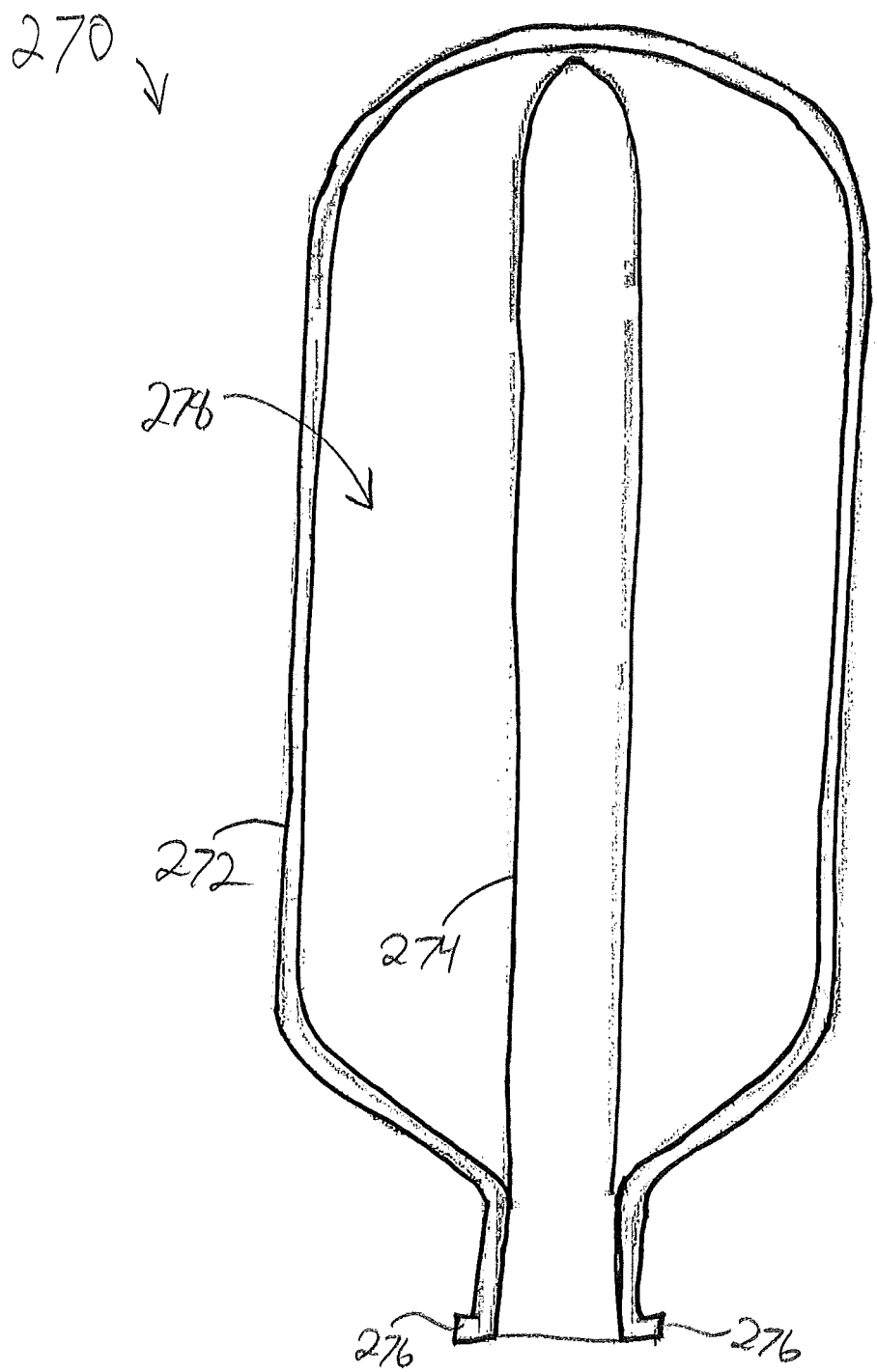
FIG. 11 depicts a front cross-sectional view of an exemplary salt cartridge of the water softening system of FIG. 10.
Figure 12:
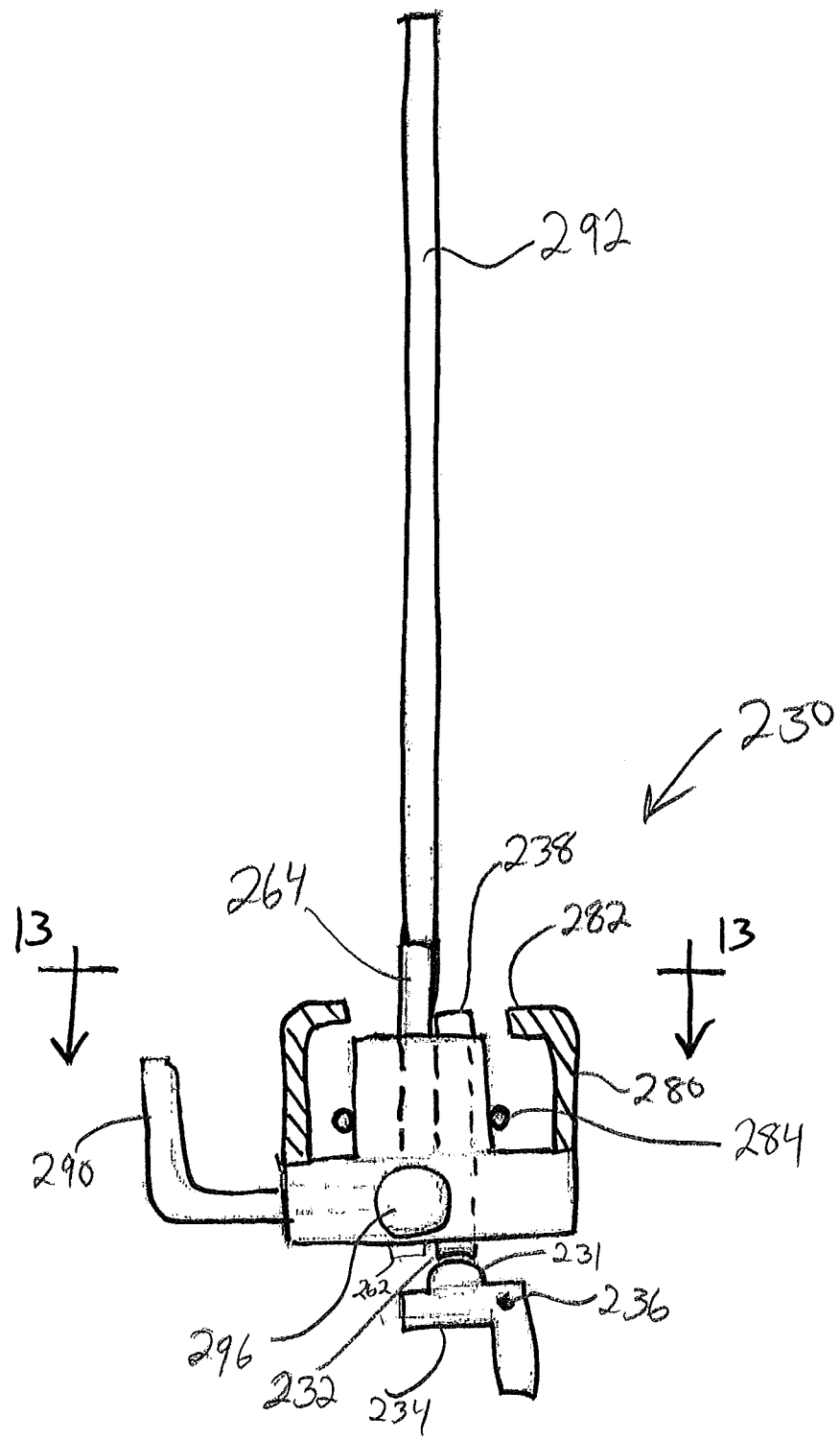
FIG. 12 depicts a partial cross-sectional view of the salt cartridge interface of the water softening system of FIG. 10.
Figure 13:
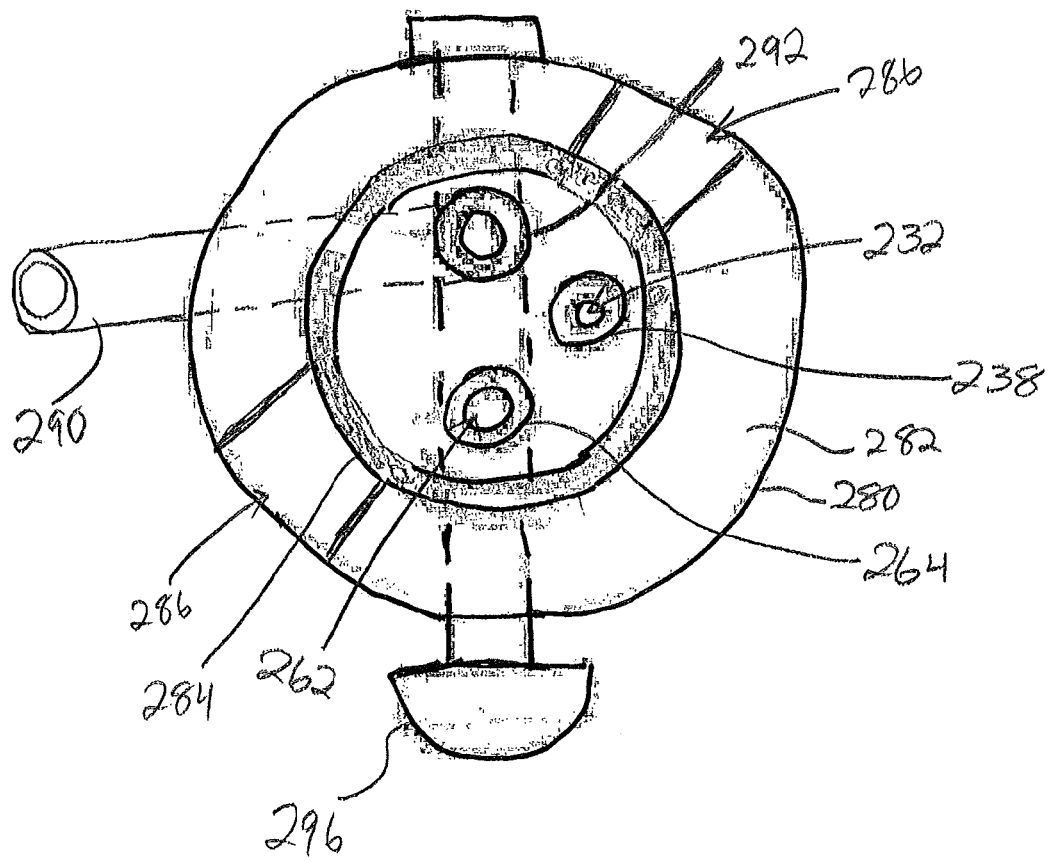
FIG. 13 depicts a top cross-sectional view of the salt cartridge interface of the water softening system of FIG. 10, taken along line 13-13 of FIG. 12.
Figure 14:
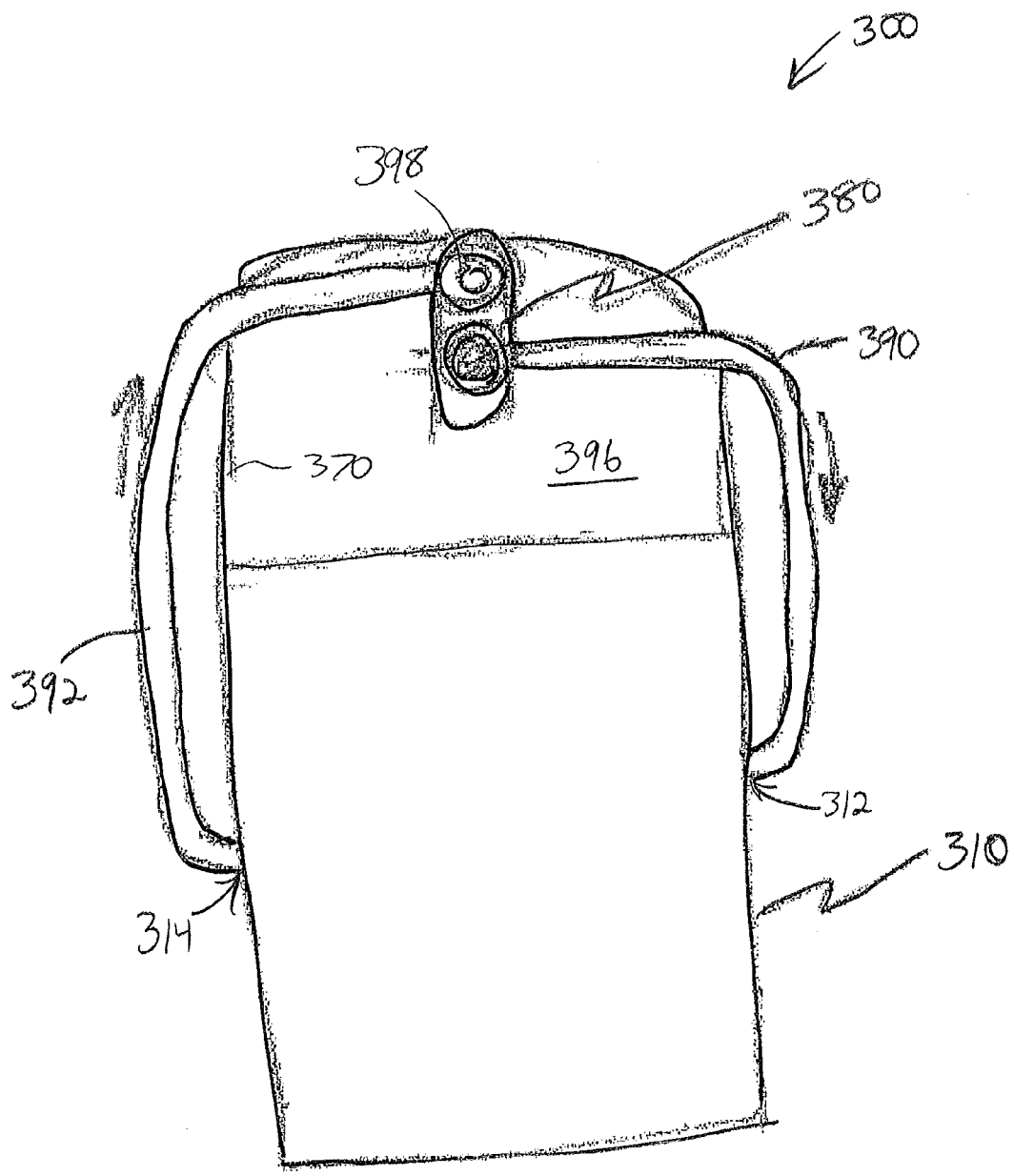
FIG. 14 depicts a front elevational view of an exemplary water softening system configured for installation in a shower.
Figure 15:
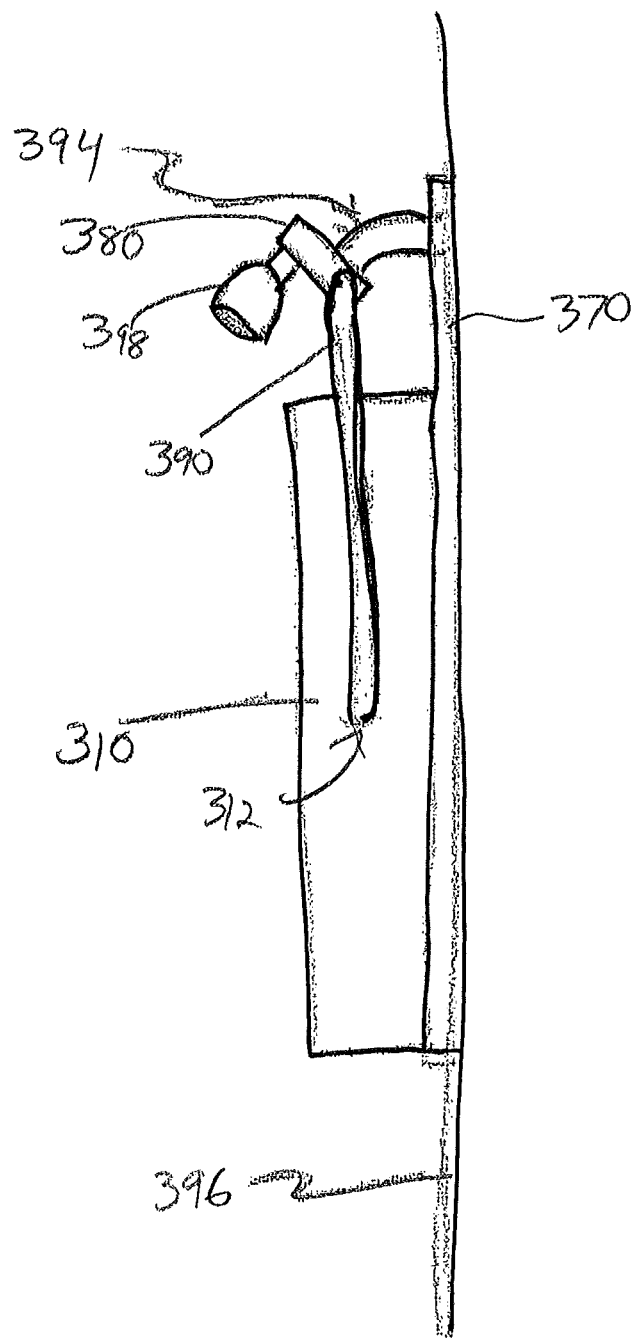
FIG. 15 depicts a side elevational views of the water softening system of FIG. 14 installed in a shower.

FIGS. 10-13 show an exemplary alternative water softening device (210) that uses a salt cartridge (270) rather than a salt chamber (30) with slabs (39). Like water softening device (10), water softening device (210) of this example includes an input port (212), an input chamber (220), an ion exchange chamber (240), an output chamber (250), and an output port (214). Water softening device (210) also includes filters (222, 242). Water softening device (210) has a salt cartridge interface (230) where salt chamber (30) was located in water softening device (10). As best seen in FIGS. 12-13, salt cartridge interface (230) includes an output port (232), an input port (262), a cartridge mount (280), and an outer vent tube (290). Output port (232) is in communication with a brine output tube (238). Input port (262) is in communication with a fill tube (264). Cartridge mount (280) includes an inwardly directed flange (282) that is operable to selectively retain salt cartridge (270) as will be described in greater detail below.

As best seen in FIG. 11, salt cartridge (270) of the present example is shaped like a bottle, though it should be understood that any other suitable shape may be used. Salt cartridge (270) includes a sidewall (272), an inner tube (274), and mounting flanges (276). A space (278) is defined between the interior of sidewall (272) and the exterior of inner tube (274). This space (278) is filled with salt (not shown) in the present example. Such salt may be in compressed form, in pellet form, or in any other suitable form. Inner tube (274) comprises a plurality of openings that are configured to allow water to pass through inner tube (274) to reach space (278); and to allow the resulting brine to pass back through inner tube (274). Various suitable structures and materials that may be used to form inner tube (274) will be apparent to those of ordinary skill in the art in view of the teachings herein. In some versions, inner tube (274) is not a separate component, but is instead formed by a void in compressed salt that fills salt cartridge (270).

Salt cartridge (270) and salt cartridge interface (230) are configured such that brine output tube (238), fill tube (264), and an inner vent tube (292) all extend into the mouth of salt cartridge (270) when salt cartridge (270) is mounted to salt cartridge interface (230). Tubes (238, 264, 290) all extend into inner tube (274) of salt cartridge (270). A seal such as an o-ring (284) provides a fluid tight seal between salt cartridge (270) and salt cartridge interface (230). Flange (282) of cartridge mount (280) cooperates with flanges (276) of salt cartridge (270) to mechanically secure salt cartridge (270) to salt cartridge interface (230). As shown in FIG. 13, flange (282) includes notches (286) that receive corresponding flanges (276) as salt cartridge (270) is linearly inserted relative to cartridge mount (280). Salt cartridge (270) is then rotated relative to cartridge mount (280), to capture flanges (275) under flange (282). Other suitable ways in which salt cartridge (270) may be secured to salt cartridge interface (230) will be apparent to those of ordinary skill in the art in view of the teachings herein.

A valve (231) is used to selectively open and close output port (232). Valve (231) is positioned on an arm (234), which is secured to a pivot (234). In the present example, valve (231) is substantially identical to valve (32) described above. Thus, valve (231) is closed when water is flowing into input port (212); and valve (231) is opened with water stops flowing into input port (212). Valve (231) thus enable brine to flow downwardly from salt cartridge (270) and into input chamber (220) to ultimately reach ion exchange chamber (240) when water stops flowing into input port (212).

As best seen in FIG. 13, salt cartridge interface (230) also includes a translating valve (296), which is operable to translate relative to salt cartridge interface (230) to selectively open or close inner vent tube (292) and fill tube (264). In particular, when translating valve (296) is in a first position, inner vent tube (292) and fill tube (264) are simultaneously open. Thus, translating valve (296) provides an open fluid path between inner vent tube (292) and outer vent tube (290); as well as an open fluid path between fill tube (264) and input port (262). When translating valve (296) is in a second position, inner vent tube (292) and fill tube (264) are simultaneously closed. In the present example, translating valve (296) is resiliently biased toward the second position. Numerous suitable features and configurations for translating valve (296) will be apparent to those of ordinary skill in the art in view of the teachings herein.

In an exemplary use of water softening device (210), a user opens a valve to start communicating water (e.g., hard water) from input port (212) toward output port (214). The water travels through input chamber (220), then through filter (222), to reach ion exchange chamber (240). The flow of water and/or associated pressures close valve (231). While the water passes through ion exchange chamber (240), the charged zeolite beads in ion exchange chamber (240) soften the water. The softened water continues through filter (242), then through output chamber (250), and then ultimately through output port (214). At some point during the flow of water into input port (12), the user pushes translating valve (296) to open up a fluid path between input chamber (20) and inner tube (274) of salt cartridge (270) via input port (262) and fill tube (264). The pushing of translating valve (296) simultaneously opens a fluid path between inner vent tube (292) and outer vent tube (290), allowing air to escape from salt cartridge (270) as salt cartridge (270) fills with water. The water mixes with salt in space (278) to form brine. The user may continue to push translating valve (296) for a predetermined time, then release translating valve (296) to enable a spring (not shown) to drive translating valve (296) proximally to effectively close inner vent tube (292) and fill tube (264). The user eventually closes a valve to cut off the supply of water to input port (212). The resulting stoppage of water and/or reduction in pressure causes valve (231) to open, thereby allowing brine to flow down from salt cartridge (270) into ion exchange chamber (240) under the influence of gravity since brine is heavier than fresh water. The brine recharges the zeolite beads in ion exchange chamber (240), such that the zeolite beads are ready to soften water again during the next use.

There are numerous ways to alert the user when translating valve (296) has been pushed long enough to sufficiently fill salt cartridge (270) with water. By way of example only, salt cartridge (270) may include a window enabling the user to see how much water is in salt cartridge (270). As another merely illustrative example, a reciprocating indicator with a lower float may protrude upwardly from salt cartridge (270), such that the indicator moves upwardly when the water level reaches the float, providing visual feedback to the user. As still another merely illustrative example, one or more sensors may trigger an audible and/or visual alert such as an audible tone and/or light to inform the user that the water has reached an appropriate level in salt cartridge (270). Other suitable ways in which the user may be informed that an appropriate level of water has been reached in salt cartridge (270) will be apparent to those of ordinary skill in the art in view of the teachings herein. As another merely illustrative example, operation of translating valve (296) may be automated. Various suitable says in which operation of translating valve (296) may be automated, including various substitutes for translating valve (296), will also be apparent to those of ordinary skill in the art in view of the teachings herein.

In some versions, the salt in space (278) is eventually depleted, such that the user will need to replace salt cartridge (270). Some examples of ways in which the user may be informed of the salt depletion will be described in greater detail below, while other examples will be apparent to those of ordinary skill in the art in view of the teachings herein. To replace salt cartridge (270), the user must first rotate salt cartridge (270) about its longitudinal axis, to align flanges (276) with notches (286). The user then pulls cartridge (270) along its longitudinal axis to decouple salt cartridge (270) from salt cartridge interface (230). Next the user slides a new salt cartridge (270) longitudinally toward salt cartridge interface (230), passing flanges (276) of the new salt cartridge (270) through notches (286), then rotates the new salt cartridge (270) to seat flanges (276) under flange (282), thereby securing the new salt cartridge (270) to salt cartridge interface (230). Of course, there are numerous other ways in which a salt cartridge (270) may removably couple with a salt cartridge interface (230). It should also be understood that, in the present example, salt cartridges (270) are configured such that they cannot be replenished with salt by the user. In other words, in the present example, salt cartridge (270) must be replaced entirely in order to replenish salt for water softening device (210). Other versions may permit the user to replenish salt in salt cartridge (270). In addition or in the alternative, salt cartridge (270) may be formed of recyclable material(s).

III. Exemplary Water Softening System Adapted for Use in Shower

FIGS. 14-17 show an example of a water softening system (300) that includes a water softening device (310) specifically adapted for installation in a shower, an input-output fitting (380), an input hose (390), and an output hose (392). Water softening device (310) of this example includes an input port (312) coupled with input hose (390) and an output port (314) coupled with output hose (392). Water softening device (310) is configured to soften hard water received through input port (312), and communicate the softened water through output port (314). The interior of water softening device (310) may be configured similar to water softening device (10), similar to water softening device (210), or otherwise. In instances where water softening device (310) receives salt cartridges (e.g., similar to salt cartridge (270) described above), such salt cartridges may be received in a manner such that they are obscured within water softening device (310) when fully seated in water softening device (310). For instance, a movable door and/or a recess may obscure at least part of salt cartridge. In other words, a salt cartridge need not necessarily be entirely exposed to the user during use of water softening device (310).

Figure 16:
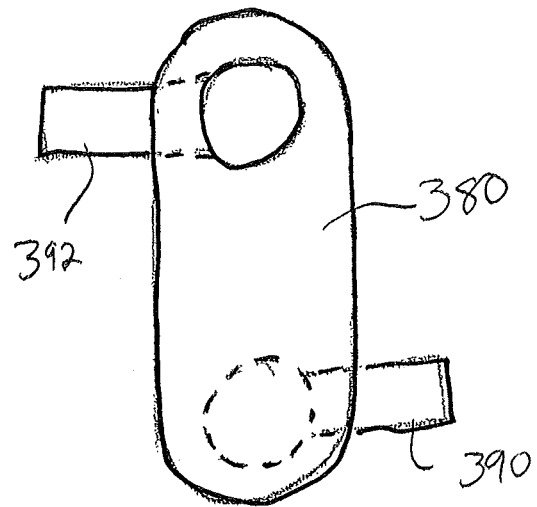
FIG. 16 a front elevational view of an input-output fitting of the water softening system of FIG. 14.
Figure 17:
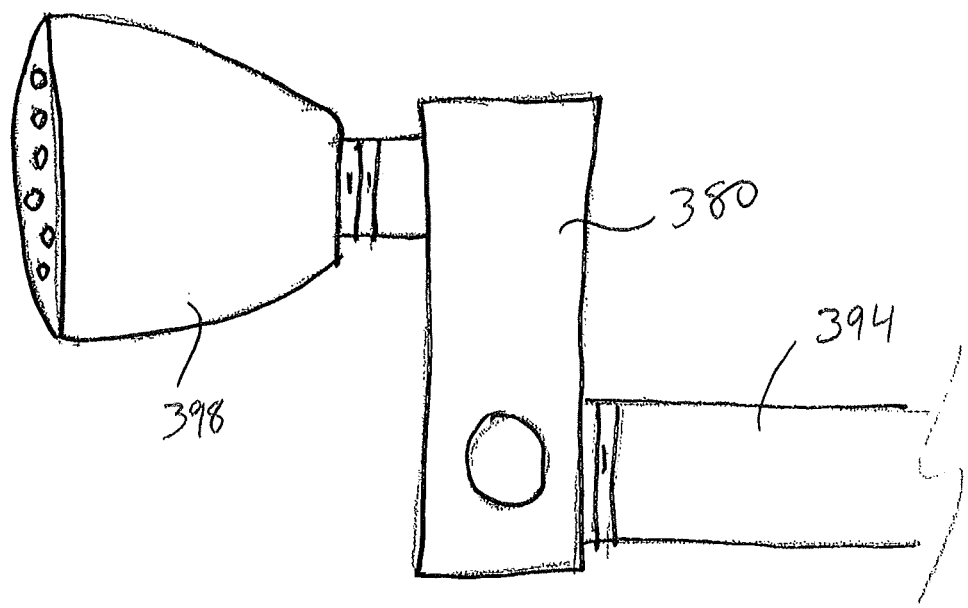
FIG. 17 depicts a side elevational view of the input-output fitting of the water softening system of FIG. 14.

As best seen in FIGS. 16-17, input-output fitting (380) is configured to fit between a conventional shower arm pipe (394) that extends from a wall (396) and a conventional shower head (398). Fitting (380) is configured to redirect water from shower arm pipe (394) to input hose (390). Fitting (380) is also configured to redirect water from output hose (392) to shower head (398). It will therefore be appreciated that water softening device (310) may be mounted in place of a conventional shower head in any suitable conventional shower. Fitting (380) may be coupled with shower arm pipe (394) and shower head (398) in any suitable fashion (e.g., with a threaded fitting, with a compression fitting, via soldering, etc.).

In the present example, water softening device (310) is supported by a strap (370), which is slung over shower arm pipe (394) at wall (396). Shower arm pipe (394) thus bears the weight of water softening device (310) at wall (396). In addition or in the alternative, suction cups, brackets, cantilever beams, and/or any other suitable features may be used to support the weight of water softening device. Other suitable structures and techniques for mounting or otherwise supporting water softening device (310) will be apparent to those of ordinary skill in the art in view of the teachings herein. While water softening system (300) of the present example is provided as a retrofit between shower arm pipe (394) and shower head (398) in this example, it should be understood that water softening device (310) may be integrated into a shower in other ways. For instance, water softening device (310) may be integrated into a shower panel system, such that hoses (390, 392) are not exposed and such that water softening device (310) is otherwise substantially hidden from view. Such versions may still provide replacement of a salt slab, salt cartridge, or other form of salt, in a manner that is not visually obtrusive. Various suitable ways in which such systems may be designed will be apparent to those of ordinary skill in the art in view of the teachings herein.

IV. Miscellaneous

Regardless of whether a salt slab, salt cartridge, or other form of salt is used, it may be desirable in some instances to provide some form of indication to the user when the salt level has been depleted, such that the salt slab, salt cartridge, or other form of salt needs to be replaced. In some versions, water softening device (10, 210, 310) includes a window enabling the user to see the amount of salt in water softening device (10, 20, 310). In addition or in the alternative, the salt may include a dye, such that the user knows that the salt is depleted when they no longer see the color of the dye in the salt. As yet another merely illustrative example, water softening device (10, 210, 310) may include a salinity sensor that detects salt levels my measuring the conductivity of water within water softening device (10, 210, 310), then triggers an audible and/or visual alert when the salinity level drops below a predetermined level. As still another merely illustrative example, water softening device (10, 210, 310) may include a weight sensor (electrical or mechanical) that senses the weight of salt in water softening device (10, 210, 310); and that then triggers an audible and/or visual alert when the weight drops below a predetermined level. Such a sensor may reset upon installation of a new salt slab, salt cartridge, etc. As yet another merely illustrative example, water softening device (10, 210, 310) may include a passive, salt sensitive sensor feature that changes color based on the amount of salt in water softening device (10, 210, 310). Other suitable features for monitoring salt levels and alerting the user will be apparent to those of ordinary skill in the art in view of the teachings herein.

It should also be understood that water softening device (10, 210, 310) may be configured to receive other types of cartridges (i.e., in addition to or in lieu of a salt cartridge), with each cartridge housing one or more substances selected to filter out one or more different types of substances from water. For instance, some cartridges may be designed to filter iron, chlorine, etc. from water. Furthermore, more than one type of cartridge may be coupled to water softening device (10, 210, 310) at a given time.

In instances where water softening device (10, 210, 310) is configured to receive a cartridge (e.g., a salt cartridge or otherwise), one or more features may be included to ensure that only a manufacturer authorized cartridge is used. For instance, the cartridge interface may include a proprietary fitting. The cartridge interface may also include RFID authentication technology or similar authentication technology. By way of example only, such authentication technology may be coupled with an electromechanical lockout feature (e.g., driven by a solenoid or something else) that only permits the cartridge to be properly seated in the interface when the authentication test is passed. In addition or in the alternative, an electromechanical valve may be coupled with authentication technology, such that the valve is only opened to permit use of the system when the authentication test is passed. Various other suitable ways in which cartridges may be authenticated, and ways in which authentication technology may be otherwise incorporated into water softening device (10, 210, 310), will be apparent to those of ordinary skill in the art in view of the teachings herein.

Some versions of water softening device (10, 210, 310) may include one or more features that require electrical power. By way of example only, such features may include sensors, authentication technology, electromechanical valves, other electromechanical features, etc. There are numerous ways in which such features may receive electrical power. By way of example only, water softening device (10, 210, 310) may include one or more batteries. In addition or in the alternative, water softening device (10, 210, 310) may include one or more solar panels. In addition or in the alternative, water softening device (10, 210, 310) may include one or more hydroelectric features that are operable to generate electricity when water is flowing through water softening device (10, 210, 310). Solar panels and/or hydroelectric features may generate enough electricity to sufficiently power electrical/electromechanical features of water softening device (10, 210, 310). In addition or in the alternative, solar panels and/or hydroelectric features may be used to recharge one or more batteries that are used to power electrical/electromechanical features of water softening device (10, 210, 310). Other suitable ways in which electrical power may be incorporated into water softening device (10, 210, 310) will be apparent to those of ordinary skill in the art in view of the teachings herein.

It should be understood that water softening device (10, 210, 310) may be installed in any suitable location. A shower is just one merely illustrative example. Other examples may include (but are not limited to) a laundry room (to soften water for a clothes washer), a bath faucet, a kitchen sink faucet, or any other suitable location. While water softening device (10, 210, 310) has been described herein as usable to soften water, it will be appreciated that water softening device (10, 210, 310) may alternatively be used to perform any other type of process or filtration of water. Similarly, it will be appreciated that water softening device (10, 210, 310) may alternatively be used with any fluid other than water for any alternative purposes. Accordingly, it is contemplated that water softening device (10, 210, 310) may be used in a variety of other contexts, and it is not intended to be necessarily limited to the uses explicitly described herein.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of any claims that may be presented and is understood not to be limited to the details of structure and operation shown and described in the specification and drawings.

I claim:
1. A system for softening water, comprising:
a housing;
the housing defining an input port configured to receive water to be softened;
the housing defining a brine chamber, wherein the brine chamber is configured to contain salt for forming a brine;
the housing defining a water softening chamber, wherein the water softening chamber is configured to contain an ion exchange material for softening the water;
the housing defining an input chamber for connecting the input port to the brine chamber and the softening chamber;
a first valve for connecting the brine chamber to the input chamber;
a first actuator responsive to the flow of water flowing into the input chamber via the input port to close the first valve when water is flowing into the input chamber via the input port and to open the first valve when no water is flowing into the input chamber via the input port;
a second valve for connecting the input chamber to the brine chamber;
a second actuator for manually opening and closing the second valve;
the housing defining an output chamber for receiving softened water from the softening chamber;
the housing defining an output port for directing softened water from the output chamber out of the housing;
whereby the first valve and first actuator prevent the flow of water into the brine chamber when water is flowing into the input chamber via the input port;
whereby the first valve and first actuator permit the flow of brine out of the brine chamber when no water is flowing into the input chamber via the input port; and
whereby the second valve permits the flow of water into the brine chamber via the input port and input chamber when manually actuated with the second actuator.
2. The system of claim 1, further comprising salt, wherein the salt is located in the brine chamber.
3. The system of claim 2, wherein the salt is in the form of a slab or a plurality of pellets.
4. The system of claim 1, further comprising an ion exchange material, wherein the ion exchange resin is located in the water softening chamber.
5. The system of claim 4, wherein the ion exchange material comprises zeolite.
6. The system of claim 1, further comprising a filter interposed adjacently between the input chamber and the water softening chamber to retain the ion exchange material within the water softening chamber.
7. The system of claim 1, further comprising a filter interposed adjacently between the water softening chamber and the output chamber to retain the ion exchange material within the water softening chamber.
8. The system of claim 1, wherein the first actuator is configured to respond to hydrodynamic pressure of water communicated through the input port, to thereby close fluid communication between the input chamber and the brine chamber as water flows in through the input port.

9. The system of claim 8, wherein the first actuator includes a pivoting member having an arm configured to selectively close the first valve as water flows in through the input.

10. The system of claim 1, wherein the second actuator includes means for biasing the second valve into a closed position.

11. The system of claim 10, wherein the second actuator includes a rod extending through the brine chamber, wherein the second valve includes a valve member secured to the rod, wherein the rod is configured to reciprocate in the brine chamber to selectively open the second valve.

12. The system of claim 11, wherein the second actuator includes a plunger secured to the rod, wherein the plunger is exposed relative to the brine chamber, wherein the plunger is manually operable to selectively open the second valve.

13. The system of claim 11, wherein the housing defines a vent port, wherein the vent port is in fluid communication with the brine chamber such that the vent port provides a path between the brine chamber and atmosphere; and a third valve operable to selectively open the vent port.

14. The system of claim 13, wherein the third valve includes a valve member secured to the rod, wherein the rod is configured to reciprocate in the brine chamber to selectively open the second valve and the third valve simultaneously.

* * * * *